(No Model.) 2 Sheets—Sheet 1.

J. CHARTER.
CLUTCH DRIVING DEVICE FOR MOTORS.

No. 542,042. Patented July 2, 1895.

Witnesses
J. A. Fairgrieve
G. P. Kramer

Inventor
John Charter
by
Foster Freeman
Attorneys (No Model.)  2 Sheets—Sheet 2.
J. CHARTER.
CLUTCH DRIVING DEVICE FOR MOTORS.
No. 542,042.  Patented July 2, 1895.
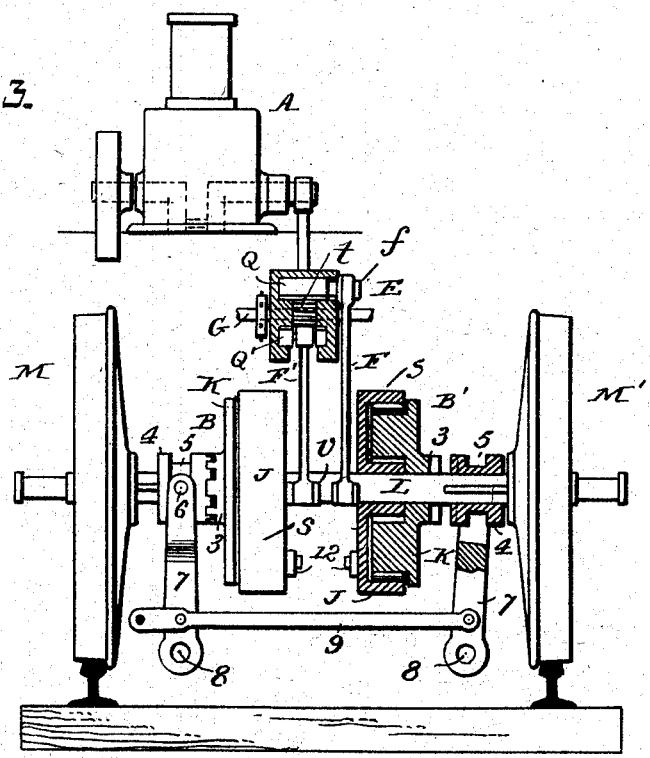
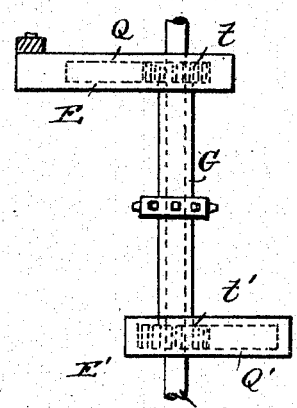
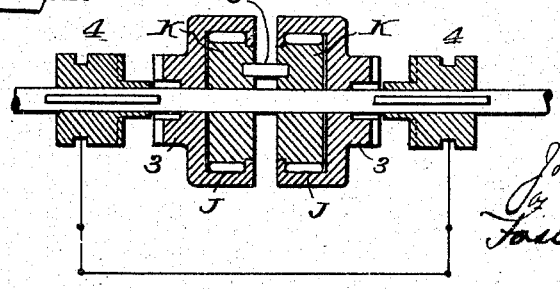
Witnesses
J. A. Faigniere
G. P. Kramer
Inventor
John Charter
by Foster Freeman
Attorneys

UNITED STATES PATENT OFFICE.

JOHN CHARTER, OF STERLING, ILLINOIS.

CLUTCH DRIVING DEVICE FOR MOTORS.

SPECIFICATION forming part of Letters Patent No. 542,042, dated July 2, 1895.

Application filed October 9, 1894. Serial No. 525,420. (No model.)

*To all whom it may concern:*

Be it known that I, JOHN CHARTER, a citizen of the United States, residing at Sterling, in the county of Whiteside and State of Illinois, have invented certain new and useful Improvements in Clutch Driving Devices for Motors, of which the following is a specification.

My invention relates to that class of driving mechanism in which shafts provided with disks having each a series of peripheral inclined edges are combined with reciprocating flanged disks and rollers between the flanges of the disks and the inclines, so that the rocking of the flanged disks in one direction causes the rollers to be wedged between the disks and the inclines and the shaft to be turned; and my invention consists in novel means for operating the parts to facilitate the varying of the speed and power and the reversal of the direction of rotation.

Figure 2:
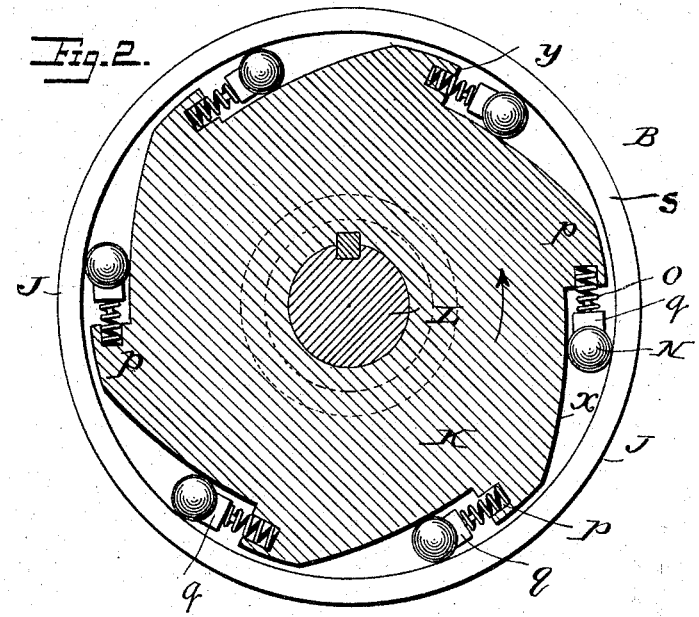
Figure 1:
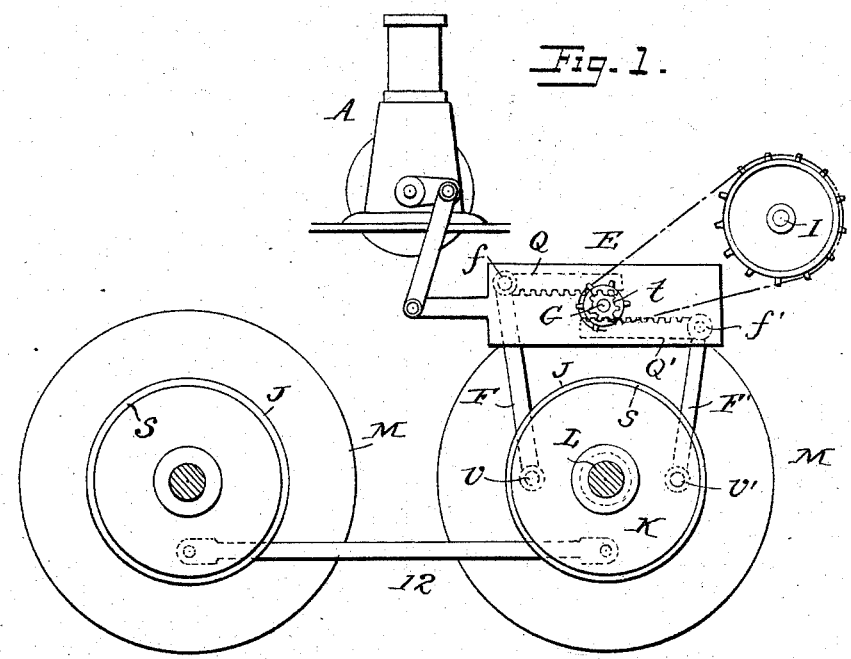

In the accompanying drawings, Figure 1 is an elevation illustrating my improved driving mechanism as applied to the wheels of a car. Fig. 2 is an enlarged sectional view of one of the driving clutch-wheels. Fig. 3 is a part transverse sectional elevation of the mechanism shown in Fig. 1. Fig. 4 is a plan view showing a modified form of lever device, and Fig. 5 is a longitudinal section showing a modified form of clutch devices.

A great deal of difficulty has been experienced in driving by means of clutches in the irregular action and unequal wear and in regulating the operation so as to vary the speed or power and in reversing the direction of movement.

In order to insure that all the parts of the clutch device shall simultaneously bite or engage the clutching-surfaces, I construct a clutch B or B' of two parts, one part in the form of a disk K on an axle or shaft L, having the periphery formed into a series of projections $p$, with inclined edges $x$ and abrupt faces $y$ and a part J, consisting of a disk with a rim $s$, which rim incloses the disk K with hard steel or other metal rollers N extending between the inner face of the rim and the inclined edges $x$. As thus made, the clutch device is like others which have been constructed, but which have proved to be ineffective because the rollers at one side of the shaft or axle L always tend to fall toward the faces $x$ of the projections $p$ without engaging the rim, while those at the other side of the shaft are in continual engagement. To overcome these difficulties I provide spring-bearings for the rollers, which always tend to throw these rollers to a position in contact both with the inside of the rim and with the corresponding inclined faces $x$. The springs may be differently arranged to act upon and carry each roller away from the adjacent face $y$. As shown, each projection $p$ has in its face $y$ one, two, or more recesses, each receiving a spring $o$, said springs bearing upon a shoe $q$ with a curved face adapted to that of the adjacent roller, which, by the pressure of the springs, is always carried away from the face $y$ to a position to always engage both converging clutching-faces. The shoes prevent any wearing of the springs and secure a uniform bearing upon the rollers. As a result of this construction, if the disk K is turned in the direction of its arrow, every roller will bite upon the adjacent converging clutching-surfaces and there will be a uniform distribution of the grip.

The clutch device may be operated by either applying power to the disk K or its shaft or to the disk of the part J. When the movement is reversed, the rollers will tend to approach the faces $y$ and will turn steadily in the curved bearings of the shoes $q$ without danger of losing their alignment, so that they are always parallel to the faces $y$ in position to grip along their whole length when the motion is again reversed. The said clutch device may be variously arranged and combined with different means for actuating the parts.

As shown in Figs. 1, 2, and 3, the part K is secured temporarily to the axle L, carrying two car-wheels M M', and the part J rocks upon said axle.

The motor-engine A, of any suitable character, is connected to a rocking beam E, vibrating upon a shaft G above the axle L, and from this rocking beam extends one or more links or connecting rods coupling each to a wrist-pin upon the part J of the clutch. The rocking of the beam E, therefore, will rock the part J in one direction to clutch the part K and in the other direction without clutching. The beam E is coupled by a link F and wrist-pins $f\,v$ with the part J.

To secure an increase of power upon an upgrade or to vary the speed when desired, I connect the upper wrist-pin $f$ to the lever E, so as to be adjustable in respect to the pivot of said lever. Any suitable adjusting means may be employed. As shown, there is a rack Q sliding in a groove of the beam or lever and carrying the pin $f$ and engaging a pinion $t$ upon the shaft G. The shaft G or its pinion may be turned in any suitable manner, as, for instance, by sprockets and a chain from a shaft I controlled by the engineer.

In order to drive the car in a reverse direction, I may use a second clutch device B', the disk of the part J of which is rocked either by a second lever or beam E or by a link F' secured to the opposite end of the same lever or beam, or to a slide Q', adjustable thereon, with teeth engaging the same pinion, so that there is a simultaneous adjustment of both clutch devices.

The second clutch device must, of course, have its inclines $x$ arranged in a reverse direction from the first, and means must be employed (when two such clutch devices are used) to connect the parts K alternately with the shaft L. As shown in Fig. 3, the hub of each part K forms one part 3 of an ordinary tooth-clutch, the other part 4 of which slides on and turns with the shaft and has a peripheral groove 5 receiving pins 6 upon a forked lever 7 pivoted at 8 to the frame. The two levers 7 are connected by a link 9, which is attached to an operating-rod under the control of the engineer, and the parts are so arranged that by moving the rod to one side or the other one or the other of the parts will be temporarily connected with the axle or shaft.

Where it is desirable to secure a greater degree of clutching action in driving the vehicle, I provide both axles with clutch devices B or B and B', or I connect the disks of the clutch devices upon the two axles by means of a connecting-rod 12, so that one operating-lever E will rock two disks.

Instead of having a single beam or lever for both clutch devices, the lever E, Fig. 4, may be secured to the rock-shaft G' near one end, and an arm E' may be connected to it at the other, and there may be two pinions $t\,t'$, one for engaging the ratchet upon the lever and the other for engaging the ratchet upon the arm E', and these two pinions may be upon a sleeve turning upon the shaft under the action of the sprocket and chain or otherwise.

In the construction shown in Fig. 5 there are two parts K K with reverse inclines, as before, connected by a pin $s'$, to which the connecting-rod F is to be attached, so that both parts K K rock together upon the shaft L.

The parts J may be alternately clutched to the shaft by means of the clutch parts 4 4, as before described.

It will be evident that with such a construction but one lever E and rack Q will be required while the shaft L may be driven in either direction. By bringing both parts to a mid-position both parts J J are disconnected at one time from the shaft.

Without limiting myself to the precise construction and arrangement of parts shown and described, I claim—

1. The combination with the rocking disk of the clutch device, of a lever connected to the connecting rod of the engine, a sliding rack, a wrist pin upon said rack, a link connecting said pin to the rocking disk, a pinion engaging the said rack, and means for turning the pinion, substantially as described.

2. The combination with the rocking disks of two clutch devices, operating in reverse directions a reciprocating lever an adjustable wrist pin carried thereby, means for adjusting said pin to and from the fulcrum of the lever, and a link connecting said pin and the rocking disks, substantially as set forth.

3. The combination of parallel shafts, a clutching device, a rocking disk carried by each shaft and forming part of the clutch device, a link connecting the two rocking disks, and a lever or beam connected with one of the rocking disks to rock the same, substantially as described.

4. The combination of the parallel shafts, clutch devices thereon, rocking disks forming parts of the clutch devices, a connecting rod connecting the disks, a rocking beam carrying an adjustable wrist pin, and a link connecting the said pin to one of the rocking disks, substantially as described.

5. The combination with a shaft, of two clutch devices each having a flanged rocking disk and a disk with projections having inclined edges, and rollers between the said edges and the flanges, the two sets of inclines being oppositely arranged, and means for clutching one part of each clutch device temporarily to the shaft, substantially as described.

6. The combination of a shaft, two clutch devices B, B' each having two parts J, K, said clutches constructed to operate in reverse directions, and means for alternately clutching one part of each clutch device to the shaft, substantially as described.

In testimony whereof I have signed my name to this specification in the presence of two subscribing witnesses.

JOHN CHARTER.

Witnesses:
JOHN M. SUAVELY,
NOAH L. HECKMAN.